Dec. 26, 1967　　　D. COHEN ET AL　　　3,360,215
MISSILE CONTROL SYSTEM FUNCTION GENERATOR
Filed Aug. 8, 1966
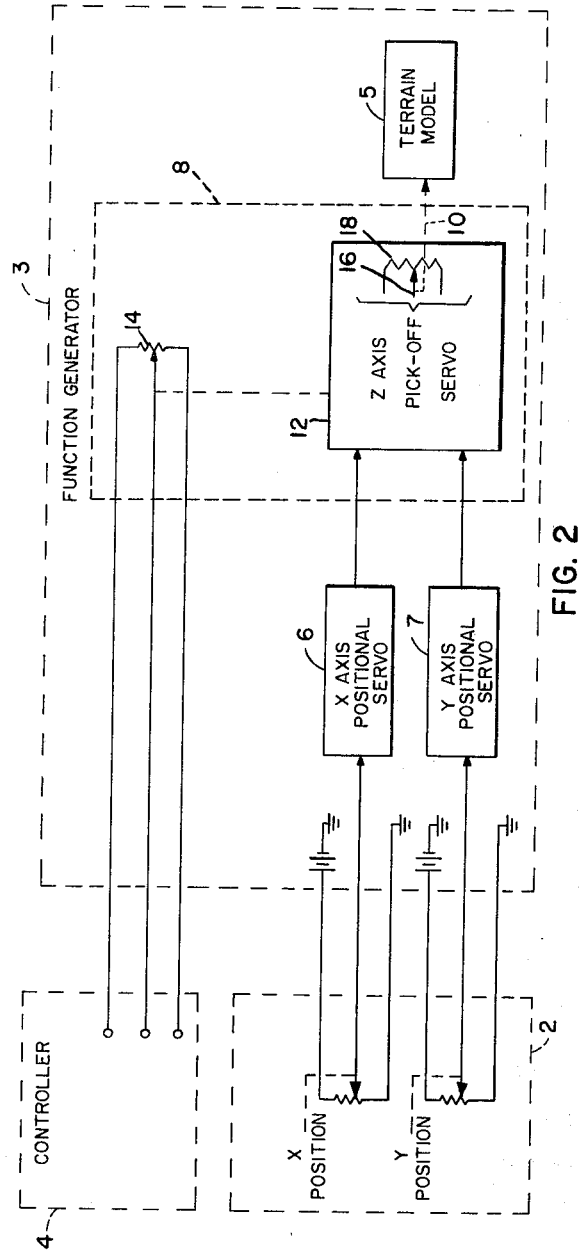
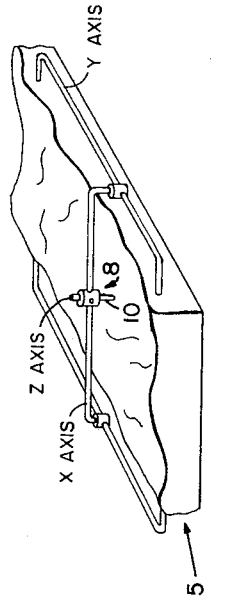
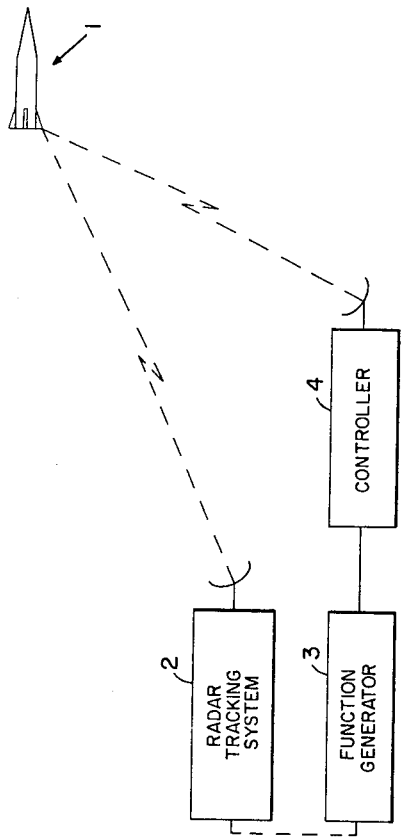
Donald Cohen
Edward T. Voight,
　　　　INVENTORS.

United States Patent Office

3,360,215
Patented Dec. 26, 1967

3,360,215
MISSILE CONTROL SYSTEM FUNCTION
GENERATOR
Donald Cohen and Edward Voight, Columbus, Ohio, assignors, by mesne assignments, to the United States of America as represented by the Secretary of the Army
Filed Aug. 8, 1966, Ser. No. 571,145
4 Claims. (Cl. 244—3.14)

ABSTRACT OF THE DISCLOSURE

A missile control system wherein the missile is tracked by radar to determine its X–Y coordinates; the X–Y coordinates are used to automatically locate a probe on a terrain model of the area over which the missile is flying; and the probe furnishes a Z coordinate (vertical) which is transmitted to the missile to control the missile altitude to follow the terrain.

---

This invention relates to a missile control system to operate over an area by reference to a miniature relief model of the area over which the missile is to operate and particularly relates to a part of this system known as a function generator. The purpose of the function generator is to continually provide a reference altitude for the barometric altimeter in the missile. This reference is a variable parameter to accomplish a desired quasiterrain clearance flight path. Inputs to the function generator are the X–Y range coordinates as determined by radar tracking facilities, and the output is a variable voltage. This voltage is proportional to the desired altitude and is transmitted to the missile.

Testing of an anti-missile missile required a missile or a simulated missile to be used as a target. This target needed to be capable of performing flight maneuvers which might be encountered from expected enemy-initiated missiles. This invention has to do with the system developed to control the target missile while in flight, particularly the height of the target missile while in flight.

It is an object of this invention to provide a function generator which furnishes an output signal which is proportional to the surface altitude of the terrain over which a target missile is flying.

The function generator is a device that generates a signal which is a function of one or two input variables. The input variables are derived from a radar system which tracks the target missile. In this specific case, the two input variables are voltage signals which establish a coordinate point on a terrain model. The terrain model is a relief map of the area over which the target missile is flying. Servo loops responsive to the inputs then drive a readout probe to the commanded coordinate point. The readout consists of generating a voltage signal proportional to the height of the terrain model above some reference plane.

The various features of novelty which characterize this invention are pointed out with particularity in the claims annexed to and forming a part of this specification. For a better understanding of this invention, however, its advantages, and specific objects attained with its use, reference should be had to the accompanying drawing and descriptive matter in which is illustrated and described a preferred embodiment of the present invention wherein:

FIGURE 1 is a diagrammatic view of a missile tracking system showing a preferred embodiment of the present invention;

FIGURES 2 is a schematic diagram of a function generator according to the present invention; and FIGURE 3 is a pictorial view of a terrain model, an integral part of the function generator depicted in FIGURES 1 and 2.

A missile 1, tracking system 2 therefor, function generator 3, and controller 4 comprise the missile control system as shown in FIGURE 1. The radar tracking system 2 tracks the missile 1 by conventional means and delivers to the function generator 3 two coordinates which locate the missile horizontally. The function generator 3 then delivers a coordinate to the controller 4 which transmits a corresponding command signal to the target missile, thus controlling its vertical position above the terrain.

The missile control system comprises a radar tracking system 2, controller 4, and a function generator 3 further comprising servo positioning motors 6 and 7, readout probe 8 which may be any conventional transducer for converting linear motion to an electrical output and terrain model 5 as indicated in FIGURE 2. The radar tracking system 2 delivers to the servo positioning motors 6 and 7 for the X and Y axis respectively, command signals which indicate the exact position of the missile in the X–Y plane of the flight range. In response to the command signals, the servo positioning motors 6 and 7 position the readout probe 8 at a point on the terrain model 5 which coincides with the flight position of the target missile.

The terrain model shown in FIGURE 3 is a relief map of the area over which the flight of the target missile is to be controlled. All missiles have certain aerodynamic limitations. With this in mind, the terrain model must be made so as not to have the rate of change of the altitude function more than the aerodynamic limitations of the missile. This invention requires that the missile be tracked by radar. The terrain model must also be constructed so that there will be no possible flight areas in which the missile would not be within the radar line-of-sight. The readout probe 8 is positioned over the terrain model by the servo positioning motors 6 and 7 of FIGURE 2 for the X and Y axis respectively. The readout probe 8 is then able to sense the height of the terrain over which the target missile is flying.

Referring again to FIGURE 2, the readout probe 8 sensing the height of the terrain model beneath it delivers to the controller 4 a voltage proportional to the height of the terrain. The controller 4 then transmits this information to the missile.

Any conventional means of detecting the height of the terrain model under the probe may be utilized without varying from the spirit of this invention. The preferred embodiment of this invention uses a servo pick-off probe similar to the closed loop proportional servo control system having a potentiometer-type sensor.

Sensing element 10, Z axis pick-off servo 12, and potentiometer 14 comprise the servo pick-off probe 8. Sensing element 10 rests on the surface of terrain model 5 shown in FIGURE 3. As the sensing element moves over the surface of the terrain model, it causes the wiper 16 of potentiometer 18 to move up and down. Potentiometer 18 places an order into the servo system. The following action of the servo mechanism results in proportional movement of potentiometer 14. Potentiometer 14 is mechanically connected to the Z axis pick-off servo 12. The feedback loop for the servo mechanism is not shown as well as other particulars well within the state of the art. Movement of potentiometer 14 results in a signal at controller 4 indicative of the height of the terrain model beneath probe 8. This signal may be a current or a voltage depending on the input structure of the controller.

Obviously, many modifications and variations of the present invention are possible in the light of the above teachings. It is, therefore, to be understood that within

What is claimed is:

1. A missile control system comprising: a missile; means for tracking said missile; means responsive to said tracking means for determining a desired altitude for said missile at any point in the flight of said missile, said altitude determining means comprising a terrain model, a readout probe disposed adjacent to said terrain model, and a first and second servo positioning motor connected to and responsive to said tracking means for positioning said readout probe on said terrain model in accordance with the real-time position of said missile; and a controller for controlling said missile in response to said altitude determining means.

2. A missile control system as set forth in claim 1 wherein said readout probe is a transducer for converting linear motion to an electrical output.

3. A missile control system as set forth in claim 2 wherein said electrical output is connected to said missile controller.

4. A missile control system as set forth in claim 1 wherein said missile tracking means is a radar system having a first and second output related to the X and Y axis of said missile position, said first and second outputs connected to said first and second servo positioning motors.

References Cited

UNITED STATES PATENTS

| | | | |
|---|---|---|---|
| 2,395,351 | 2/1946 | Sohn | 343—5 |
| 2,557,949 | 6/1951 | Deloraine | 244—3.14 |
| 2,594,305 | 4/1952 | Haller | 244—3.14 |
| 2,708,148 | 5/1955 | Clark | 343—5 |
| 2,710,962 | 6/1955 | Fritze | 244—3.14 |
| 2,814,199 | 11/1957 | Waldorf et al. | 343—5 |
| 2,912,761 | 11/1959 | Woodward et al. | 343—5 |
| 2,944,763 | 7/1960 | Grandgent et al. | 244—3.14 |
| 2,956,274 | 10/1960 | Smythe | 343—5 |
| 2,966,655 | 12/1960 | Thiede | 343—5 |
| 2,979,714 | 4/1961 | Wallace | 343—5 |

BENJAMIN A. BORCHELT, *Primary Examiner.*

T. H. WEBB, *Assistant Examiner.*